US008638545B2

(12) United States Patent
Nakayama et al.

(10) Patent No.: US 8,638,545 B2
(45) Date of Patent: Jan. 28, 2014

(54) ELECTRODE STRUCTURE, CAPACITOR, BATTERY, AND METHOD FOR MANUFACTURING ELECTRODE STRUCTURE

(71) Applicant: Toyo Aluminium Kabushiki Kaisha, Osaka (JP)

(72) Inventors: Kunihiko Nakayama, Osaka (JP); Zenya Ashitaka, Osaka (JP); Hietoshi Inoue, Osaka (JP)

(73) Assignee: Toyo Aluminium Kabushiki Kaisha, Osaka-shi (JP)

(*) Notice: Subject to any disclaimer, the term of this patent is extended or adjusted under 35 U.S.C. 154(b) by 0 days.

(21) Appl. No.: 13/752,075

(22) Filed: Jan. 28, 2013

(65) Prior Publication Data

US 2013/0196056 A1     Aug. 1, 2013

Related U.S. Application Data

(62) Division of application No. 13/255,448, filed as application No. PCT/JP2010/001488 on Mar. 4, 2010, now Pat. No. 8,385,051.

(30) Foreign Application Priority Data

Mar. 23, 2009    (JP) ................................. 2009-069290

(51) Int. Cl.
    *H01G 9/00*          (2006.01)

(52) U.S. Cl.
    USPC ........... 361/502; 361/503; 361/504; 361/512; 361/517; 361/528

(58) Field of Classification Search
    USPC ................. 361/502, 503–504, 508, 509, 512, 361/516–519, 523–528, 303–305; 29/25.01, 25.03

See application file for complete search history.

(56) References Cited

U.S. PATENT DOCUMENTS

| 4,873,610 A | 10/1989 | Shimizu et al. |
| 5,754,392 A | 5/1998 | Cava |
| 5,939,194 A | 8/1999 | Hashimoto et al. |
| 6,033,722 A * | 3/2000 | Koike et al. ..................... 427/58 |

(Continued)

FOREIGN PATENT DOCUMENTS

| CN | 1777965 A1 | 5/2006 |
| JP | 62-222512 A | 9/1987 |

(Continued)

*Primary Examiner* — Nguyen T Ha
(74) *Attorney, Agent, or Firm* — Birch, Stewart, Kolasch & Birch, LLP (57) ABSTRACT

An electrode structure which provides adhesiveness between an aluminum material, as a base material, and a dielectric layer, and adhesiveness between the dielectric layers, and enables a high capacitance, even with a thick dielectric layer. An interposing layer is formed in at least one part of a region of the surface of the aluminum material between the aluminum material and the dielectric layer and includes aluminum and carbon. The dielectric layer includes dielectric particles including valve metal, and an organic substance layer formed on at least one part of a surface of the dielectric particle. A mixture layer of dielectric particles, including the valve metal and a binder, is formed on a surface of the aluminum material, and thereafter, the aluminum material is heated in a state where the aluminum material is placed in a space including a hydrocarbon-containing substance.

3 Claims, 1 Drawing Sheet

(56) References Cited

U.S. PATENT DOCUMENTS

| | | | |
|---|---|---|---|
| 6,287,673 B1 | 9/2001 | Katsir et al. | |
| 6,756,155 B1* | 6/2004 | Kweon et al. | 429/231.95 |
| 6,808,845 B1* | 10/2004 | Nonaka et al. | 429/213 |
| 7,112,228 B2* | 9/2006 | Nogami et al. | 29/623.5 |
| 7,951,491 B2* | 5/2011 | Tokunaga et al. | 429/232 |
| 8,178,238 B2* | 5/2012 | Soma et al. | 429/219 |
| 8,404,126 B2* | 3/2013 | Ando et al. | 216/13 |
| 2006/0171102 A1 | 8/2006 | Ro et al. | |
| 2008/0130202 A1 | 6/2008 | Ro et al. | |

FOREIGN PATENT DOCUMENTS

| | | |
|---|---|---|
| JP | 8-167543 A | 6/1996 |
| JP | 10-182221 A | 7/1998 |
| JP | 11-317331 A | 11/1999 |
| JP | 2000-12400 A | 1/2000 |
| JP | 2003-55796 A | 2/2003 |
| JP | 2004-259932 A | 9/2004 |
| WO | WO 02/062569 A1 | 8/2002 |
| WO | WO 2006/035579 A1 | 4/2006 |
| WO | WO 2007/055121 A1 | 5/2007 |

* cited by examiner

Counts/Raman Shift(cm-1)

ELECTRODE STRUCTURE, CAPACITOR, BATTERY, AND METHOD FOR MANUFACTURING ELECTRODE STRUCTURE

This application is a Divisional of co-pending application Ser. No. 13/255,448 filed on Sep. 8, 2011 and for which priority is claimed under 35 U.S.C. §120. Application Ser. No. 13/255,448 is the national phase of PCT International Application No. PCT/JP2010/001488 filed on Mar. 24, 2010 under 35 U.S.C. §371. The entire contents of each of the above-identified applications are hereby incorporated by reference.

TECHNICAL FIELD

The present invention relates generally to electrode structures, capacitors, batteries, and methods for manufacturing electrode structures, and more particularly, to an electrode structure used as a material of a capacitor, a battery, or the like, a capacitor and a battery, each of which includes the above-mentioned electrode structure, and a method for manufacturing the above-mentioned electrode structure.

BACKGROUND ART

For example, as disclosed in Japanese Patent Application Laid-Open Publication No. 62-222512 (Patent Document 1), a dielectric material having a high permittivity is widely used as an electronic material of a capacitor, a semiconductor device, a light-emitting device, or the like.

A capacitor includes two electrodes, that is, an anode and a cathode. As an anode material of an electrolytic capacitor, valve metal such as aluminum and tantalum, which allows an insulating oxide layer to be generated on a surface thereof, is used. Here, the valve metal is metal covered by an oxide layer through anode oxidation, and as the valve metal, aluminum, tantalum, niobium, titanium, hafnium, zirconium, zinc, tungsten, bismuth, antimony, and the like are cited. As a cathode material, any of an electrolytic solution, an inorganic semiconductor, an organic electrically conductive substance, or a metal thin film is used. In a case where the cathode material is the electrolytic solution, it is often the case that aluminum foil whose surface area is enlarged is used as a cathode terminal.

Conventionally, some methods of increasing a capacitance of a capacitor have been proposed.

For example, as a method of enlarging surface areas of anode and cathode terminals, Japanese Patent Application Laid-Open Publication No. 2004-259932 (Patent Document 2) discloses a method in which crystalline oxide including Pb is formed so as to be evenly distributed on a surface of aluminum foil and surface dissolution caused upon etching is suppressed, thereby obtaining the enlarged surface areas after the etching.

In addition, for example, as a method of forming a film which has high adhesiveness and is thick, Japanese Patent Application Laid-Open Publication No. 2003-55796 (Patent Document 3) discloses a method in which a titanium-phosphorus based composite oxide film is attached onto a surface of an aluminum base material.

Further, for example, as a material used for configuring a capacitive element, Japanese Patent Application Laid-Open Publication No. 10-182221 (Patent Document 4) discloses an article whose temperature coefficient of a permittivity is smaller.

Furthermore, for example, as a method of increasing surface areas of foil electrodes of an electrolytic capacitor, Japanese Patent Application Laid-Open Publication No. 11-317331 (Patent Document 5) discloses a method which includes a step of placing a base material in an inert atmosphere having a pressure of approximately $10^{-3}$ Torr through approximately $10^{-2}$ Torr and a step of evaporating valve metal onto a base material under an inert atmosphere to provide the base material with a surface structure body. However, in the method in which a dielectric layer including the valve metal is formed by the evaporation, not only it is required to retain a high vacuum but also it is difficult to industrially form a dielectric layer having an even thickness.

In the meantime, by using a sol-gel method, as compared with the evaporation method, it is easy to form a dielectric layer including the valve metal and the dielectric layer having the even thickness can be industrially formed. However, in the dielectric layer obtained by using the sol-gel method, defects such as cracks are easily caused in a step of forming the dielectric layer by heating a dielectric precursor, thereby leading to, for example, the problems in that adhesiveness to aluminum as a base material is weakened, that alumina is formed between a dielectric layer and an aluminum substrate, thereby reducing a capacitance, and that a desired withstanding voltage cannot be obtained.

As a method of solving the above-mentioned problems, for example, International Publication No. WO 02/062569 (Patent Document 6) discloses a method of manufacturing a structure body having an oxide layer on a base substance. This method includes: an application liquid preparation step of preparing an application liquid for an oxide layer; a base substance surface preprocessing step of obtaining a preprocessed base substance by preprocessing a surface of a base substance, aside from the application liquid preparation step; an application step of obtaining a coated base substance by applying the application liquid for an oxide layer to the preprocessed base substance; and a firing step of forming g an oxide layer on the base substance by firing the coated base substance, and the base substance surface preprocessing step includes a first process of causing a surface of the base substance to have a one-dimensional or two-dimensional ordered structure.

However, even by employing this method, it is difficult to obtain an electrode structure which is excellent in adhesiveness and allows a high capacitance to be obtained with a desired withstanding voltage being maintained.

Therefore, International Publication No. WO 2007/055121 (Patent Document 7) discloses a method in which in order to improve adhesiveness between an aluminum material as a base material and a dielectric layer, a dielectric precursor including valve metal is formed on the aluminum material, and thereafter, by heating the resultant in a hydrocarbon atmosphere, a dielectric layer including the valve metal is formed on a surface of the aluminum material and an interposing layer including aluminum and carbon is formed between the aluminum material and the dielectric layer, thereby enhancing the adhesiveness between the aluminum material and the dielectric layer.

CITATION LIST

Patent Literature

Patent Document 1: Japanese Patent Application Laid-Open Publication No. 62-222512
Patent Document 2: Japanese Patent Application Laid-Open Publication No. 2004-259932
Patent Document 3: Japanese Patent Application Laid-Open Publication No. 2003-55796

Patent Document 4: Japanese Patent Application Laid-Open Publication No. 10-182221

Patent Document 5: Japanese Patent Application Laid-Open Publication No. 11-317331

Patent Document 6: International Publication No. WO 02/062569

Patent Document 7: International Publication No. WO 2007/055121

SUMMARY OF THE INVENTION

Technical Problem

In the method disclosed in International Publication No. WO 2007/055121 (Patent Document 7), as a method of forming the dielectric layer, the so-called sol-gel method is favorably adopted. However, when in order to enhance a capacitance, a thickness of the dielectric layer is rendered thick, defects such as cracks are caused, thereby drastically reducing adhesiveness between the aluminum material and the dielectric layer and adhesiveness between the dielectric layers. Therefore, in the above-mentioned method, there is a limit to the thickness of the dielectric layer which can be formed on the surface of the aluminum material, and as a result, there is a limit to a value of the obtained capacitance.

Hence, objects of the present invention are to solve the above-described problems and to provide an electrode structure which is excellent in the adhesiveness between the aluminum material as the base material and the dielectric layer and the adhesiveness between the dielectric layers and allows a higher capacitance than the conventional one to be obtained even with the thickness of the dielectric layer being large; a method for manufacturing the above-mentioned electrode structure; and a capacitor and a battery, each of which includes the above-mentioned electrode structure.

Solution to Problem

In order to solve the problems of the conventional technology, the present inventors have repeated eager researches. As a result, the present inventors found that a mixture layer of a binder and dielectric particles including valve metal is formed on a surface of a aluminum material and this aluminum material is heated under specific conditions, thereby making it possible to obtain an electrode structure which allows the above-mentioned objects to be achieved. Based on the findings by the present inventors, the present invention was made.

An electrode structure according to the present invention comprises: an aluminum material; a dielectric layer formed on a surface of the aluminum material; and an interposing layer formed in at least one part of a region of the surface of the aluminum material between the aluminum material and the dielectric layer and including aluminum and carbon, the dielectric layer includes dielectric particles including valve metal, and an organic substance layer is formed on at least one part of a surface of the dielectric particle.

In the electrode structure according to the present invention, it is preferable that the valve metal is one kind or more selected from the group consisting of titanium, tantalum, hafnium, zirconium, and niobium.

Since the electrode structure according to the present invention allows adhesiveness between the aluminum material and the dielectric layer and adhesiveness between the dielectric layers to be enhanced, a thickness of the dielectric layer can be made greater than or equal to 0.5 μm. Although the upper limit of the thickness of the dielectric layer is not particularly limited, in consideration of industrial production, it is preferable that the upper limit thereof is less than or equal to 20 μm.

In addition, in the electrode structure according to the present invention, it is preferable that the interposing layer includes crystallized aluminum carbide.

Furthermore, in the electrode structure according to the present invention, it is preferable that the interposing layer includes aluminum oxide.

A capacitor according to the present invention includes the electrode structure having at least any of the above-described features. Although the capacitor in the present invention implies an electrolytic capacitor, an electrical double layer capacitor, and the like, these are merely cited as examples thereof, and the present invention is not limited thereto. In addition, in a case where the electrode structure having at least any of the above-described features is applied to a capacitor, the electrode structure according to the present invention is applicable to not only a current collector and an electrode as members which constitute a capacitor but also members other than the current collector and the electrode of a capacitor.

A battery according to the present invention includes the electrode structure having at least any of the above-described features. Although the battery in the present invention implies a lithium battery, a lithium ion battery, and the like, these are merely cited as examples thereof, and the present invention is not limited thereto. In addition, in a case where the electrode structure having at least any of the above-described features is applied to a battery, the electrode structure according to the present invention is applicable to not only a current collector and an electrode as members which constitute a battery but also members other than the current collector and the electrode of a battery.

A method, according to the present invention, for manufacturing the electrode structure includes: a mixture layer formation step of forming a mixture layer of dielectric particles including valve metal and a binder on a surface of an aluminum material; and a heating step of heating the aluminum material in a state where the aluminum material having the mixture layer formed thereon is placed in a space including a hydrocarbon-containing substance.

In the method, according to the present invention, for manufacturing the electrode structure, it is preferable that the heating step of heating the aluminum material in the state where the aluminum material having the mixture layer formed thereon is placed in the space including the hydrocarbon-containing substance is conducted at a temperature in a range of greater than or equal to 450° C. and less than 660° C.

The method, according to the present invention, for manufacturing the electrode structure may further include a step of heating the aluminum material in a state where the aluminum material is placed in a space including oxygen, after the step of heating the aluminum material in the state where the aluminum material having the mixture layer formed thereon is placed in the space including the hydrocarbon-containing substance.

In the method, according to the present invention, for manufacturing the electrode structure, it is preferable that the step of heating the aluminum material in the state where the aluminum material is placed in the space including the oxygen, after the step of heating the aluminum material in the state where the aluminum material having the mixture layer formed thereon is placed in the space including the hydrocarbon-containing substance, is conducted at a temperature of less than or equal to 400° C.

Advantageous Effects of the Invention

According to the present invention, in an electrode structure used for a capacitor, a battery, and the like, even when a thickness of a dielectric layer is rendered thick, excellent adhesiveness between an aluminum material as a base material and a dielectric layer, excellent adhesiveness between the dielectric layers, and a higher capacitance than the conventional one can be obtained.

DESCRIPTION OF EMBODIMENTS (Aluminum Material)

In one embodiment of the present invention, an aluminum material as a base material, on which a dielectric layer is formed, is not particularly limited, and foil of pure aluminum or an aluminum alloy can be used. It is preferable that such an aluminum material has an aluminum purity of greater than or equal to 98% by mass which is a value measured in accordance with a method described in "JIS H 2111". As the aluminum material used in the present invention, also included are an aluminum alloy having composition in which at least one kind selected from the group consisting of alloy elements of lead (Pb), silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B) is added, with an added amount thereof being within a required range; and aluminum having composition in which a content of the above-mentioned unavoidable impurity element is limited. Although a thickness of the aluminum material is not particularly limited, in general, it is preferable that the thickness thereof is within a range of greater than or equal to 5 μm and less than or equal to 200 μm.

As the above-mentioned aluminum material, an aluminum material manufactured by the heretofore known method can be used. For example, molten aluminum or a molten aluminum alloy, which has the above-mentioned predetermined composition, is prepared; the molten aluminum or the molten aluminum alloy is cast, thereby obtaining an ingot; and the obtained ingot is appropriately subjected to homogenization processing. Thereafter, this ingot is subjected to hot rolling and cold rolling, thereby allowing the aluminum material as a base material to be obtained. Midway through the step of the above-mentioned cold rolling, process annealing processing at a temperature within a range of greater than or equal to 150° C. and less than or equal to 400° C. may be conducted.

In addition, before the later-described step of forming a mixture layer, the aluminum material may be appropriately subjected to preprocessing.

(Dielectric Layer)

The dielectric layer includes dielectric particles including valve metal, and an organic substance layer is formed on at least one part of a surface of the dielectric particle. Since an electrode structure according to the present invention allows adhesiveness between the aluminum material and the dielectric layer and adhesiveness between the dielectric layers to be enhanced, a thickness of the dielectric layer can be made greater than or equal to 0.5 μm. Although the upper limit of the thickness of the dielectric layer is not particularly limited, in consideration of industrial production, it is preferable that the upper limit thereof is less than or equal to 20 μm. Hereinafter, a configuration of this dielectric layer will be described.

<Dielectric Particle>

The valve metal included in the dielectric particle is not particularly limited, and magnesium, thorium, cadmium, tungsten, tin, iron, silver, silicon, tantalum, titanium, hafnium, aluminum, zirconium, niobium, and the like are cited. In particular, titanium, tantalum, hafnium, zirconium, or niobium is favorably used. The dielectric particle is not particularly limited, and it is only required for the dielectric particle to include the above-mentioned valve metal. Specifically, a particle of titanium oxide, tantalum oxide, hafnium oxide, zirconium oxide, niobium oxide, or the like is cited. Among these, it is preferable to use the titanium oxide as the dielectric particle in terms of a relative permittivity.

A particle diameter of the dielectric particle is not particularly limited. It is preferable that the particle diameter is greater than or equal to 5 nm and less than or equal to 100 nm and further, it is more preferable that the particle diameter is less than or equal to 50 nm. Since it is easy to evenly form an organic substance layer on a surface of the dielectric particle having the particle diameter of greater than or equal to 5 nm, such dielectric particles are easily dispersed in a binder in a step of forming a mixture layer of the dielectric particles and the binder. The dielectric particle having the particle diameter of less than or equal to 100 nm allows a surface area for ensuring a predetermined capacitance to be made large. This particle diameter can be measured by employing a method such as a powder X-ray diffractometry, a dynamic light scattering method, an induced grating method, a transmission electron microscope method. In the present invention, the particle diameter is measured by employing the powder X-ray diffractometry.

As the dielectric particle, a particle obtained by employing a variety of methods can be used. Specifically, in a case where for example, the titanium oxide is used as the dielectric particle, a particle obtained by employing a method such as a sulfuric acid method and a chlorine method can be used. The dielectric particle formed of the titanium oxide such as "trade name: ST-01 manufactured by ISHIHARA SANGYO KAISHA, LTD." and "trade name: MT-150A manufactured by TAYCA CORPORATION" is sold on the market and is commercially available.

<Organic Substance Layer>

The organic substance layer is formed on the surface of the dielectric particle by conducting the later-described mixture layer formation step and heating step.

In the mixture layer formation step, the mixture layer of the dielectric particles and the binder is formed on the surface of the aluminum material, and this binder is neither completely oxidized nor vanished and becomes the organic substance layer including at least elements of carbon, hydrogen, and oxygen in the subsequent heating step. This causes the organic substance layer having an appropriate thickness to be present on the surface of the dielectric particle.

Although the organic substance layer may be formed on at least one part of the surface of the dielectric particle, the organic substance layer may be formed thereon so as to cover the whole surface of the dielectric particle. Since in the part on which the organic substance layer is formed, adhesiveness between the dielectric particle and the aluminum material and adhesiveness between the dielectric particles are enhanced, adhesiveness between the whole dielectric layer and the aluminum material is enhanced.

Even in a case where the organic substance layer is not formed on the surface of the dielectric particle, through conducting the heating step, the dielectric particle comes to have a certain degree of adhesiveness to the other dielectric particle or a certain degree of adhesiveness to the surface of the aluminum material. Therefore, in a case where a thickness of the dielectric layer is thin, a certain degree of adhesiveness between the whole dielectric layer and the aluminum material can be ensured. However, in a case where the thickness of the dielectric layer is rendered thick, the dielectric layer is easily exfoliated from the surface of the aluminum material or exfoliation between the dielectric layers easily occurs. This occurs similarly even in a case where the dielectric layer is formed by employing the sol-gel method, and when in order to enhance a capacitance, the thickness of the dielectric layer is rendered thick, defects such as cracks are caused, thereby drastically reducing adhesiveness between the aluminum material and the dielectric layer and adhesiveness between the dielectric layers.

On the other hand, in the electrode structure according to the present invention, the organic substance layer is formed on at least one part of the surface of the dielectric particle. Thus, even in the case where the thickness of the dielectric layer is rendered thick, in addition to the effect to enhance the adhesiveness between the aluminum material as the base material and the dielectric layer, the organic substance layer has an effect to enhance mutual adhesiveness among the dielectric particles. Owing to the interaction of the above-mentioned effects, the electrode structure according to the present invention is excellent in the adhesiveness between the aluminum material and the dielectric layer and the adhesiveness between the dielectric layers and allows a higher capacitance than the conventional one to be obtained.

It is preferable that the organic substance layer includes at least elements of carbon, hydrogen, and oxygen.

In addition, a thickness of this organic substance layer is not particularly limited, and it is preferable that the thickness thereof is less than or equal to 50 nm and it is more preferable that the thickness thereof is less than or equal to 30 nm. In order to effectively exhibit the above-mentioned effects, it is preferable that the thickness of the organic substance layer is greater than or equal to 1 nm. If the organic substance layer is rendered excessively thick, interstices among the dielectric particles included in the dielectric layer come to be densely filled with the organic substance layer. This causes a surface area of the dielectric layer formed on the surface of the aluminum material to be small, thereby conversely reducing a capacitance.

(Interposing Layer Including Aluminum and Carbon)

The electrode structure according to the present invention further includes an interposing layer, which is formed in at least one part of a region of the surface of the aluminum material between the aluminum material as the base material and the dielectric layer and includes aluminum and carbon.

The interposing layer including the aluminum and the carbon can be obtained by subjecting the aluminum material, having the mixture layer of the dielectric particles and the binder formed on the surface thereof, to heat treatment in an atmosphere including a hydrocarbon-containing substance.

The interposing layer including the aluminum and the carbon enhances the adhesiveness between the aluminum material as the base material and the dielectric layer, suppresses generation of an interposing layer including aluminum and oxygen, which is formed between the aluminum material as the base material and the dielectric layer, and reduces a resistance value between the aluminum material and the dielectric layer. Thus, the electrode structure having a high capacitance can be provided.

Furthermore, it is preferable that the interposing layer including the aluminum and the carbon includes crystallized aluminum carbide. The crystallized aluminum carbide has an effect to further enhance the adhesiveness.

In addition, the interposing layer including the aluminum and the carbon may include aluminum oxide. The aluminum oxide has effects to fill parts of defects such as cracks caused in the dielectric layer therewith and to prevent a leakage current from increasing. However, since excessive formation of the oxide causes the resistance value between the base material and the dielectric layer to be increased, a capacitance is likely to be reduced.

(Method for Manufacturing Electrode Structure)

A method, according to the present invention, for manufacturing the electrode structure includes: a mixture layer formation step of forming the mixture layer of the dielectric particles including the valve metal and the binder on the surface of the aluminum material; and a heating step of thereafter heating the aluminum material having the mixture layer formed thereon in a state where the aluminum material is placed in a space including the hydrocarbon-containing substance. Hereinafter, each of the steps will be described.

<Mixture Layer Formation Step>

In the mixture layer formation step, the mixture layer of the dielectric particles including the valve metal and the binder is formed on the surface of the aluminum material.

The binder used in the mixture layer formation step is not particularly limited. For example, as the binder, cited is a synthetic resin such as a carboxy modified polyolefin resin, a vinyl acetate resin, a vinyl chloride resin, a vinyl chloride-vinyl acetate copolymer resin, a vinyl alcohol resin, a vinyl fluoride resin, an acrylic resin, a polyester resin, a urethane resin, an epoxy resin, a urea resin, a phenol resin, an acrylonitrile resin, a nitrocellulose resin, a paraffin wax, and a polyethylene wax; or further, a natural resin such as wax, tar, glue, Japanese lacquer, a pine resin, and beeswax yellow wax. More preferably among these, it is preferable to use a resin which is not completely volatilized by heating conducted in a hydrocarbon atmosphere at a temperature in a range of greater than or equal to 450° C. and less than or equal to 660° C. for a period of time in a range of greater than or equal to 1 hour and less than or equal to 100 hours. If the binder is completely volatilized in the heat treatment step conducted in the hydrocarbon atmosphere, defects or cracks in the dielectric layer are caused, and the adhesiveness between the aluminum material as the base material and the dielectric layer and the adhesiveness between the dielectric layers are reduced, as compared with a case where the binder is not used.

A method of forming the mixture layer of the dielectric particles including the valve metal and the binder on the surface of the aluminum material as the base material is not particularly limited. For example, an application liquid including the above-mentioned mixture may be prepared and applied onto the surface of the aluminum. A method of the application is not particularly limited, and a spin coating method, a bar coating method, a flow coating method, or a dip coating method is appropriately adopted. A film thickness of the mixture layer formed by the application can be controlled by the number of times at which coating is conducted and composition and a concentration of the application liquid.

In the method, according to the present invention, for manufacturing the electrode structure, it is preferable that the mixture layer formation step includes a step of mixing the dielectric particles and the binder (mixing step). The mixture layer formation step includes the above-mentioned mixing step, thereby allowing an extreme uneven distribution of the dielectric particles or the binder in the mixture to be avoided and enabling the organic substance layer formed by undergoing the subsequent heating step to be evenly formed on the surface of the dielectric particle. Thus, the adhesiveness between the dielectric layer and the aluminum material can be further enhanced and the mutual adhesiveness between the dielectric particles included in the dielectric layer can also be enhanced. As a result, a thickness of the dielectric layer can be rendered thick.

Upon conducting the above-mentioned mixing step, a solvent may be added, and the mixing of the dielectric particles and the binder may be thereby made efficient. Furthermore, a mixing method and a mixing time period are not particularly limited, and it is only required to allow the extreme uneven distribution of the dielectric particles or the binder to be avoided.

Although the solvent appropriately used in the mixture layer formation step is not particularly limited, a good solvent of the binder (solvent in which the binder is soluble) is preferable. For example, cited is a ketone based solvent such as acetone, methyl ethyl ketone, and methyl isobutyl ketone; an ester based solvent such as ethyl acetate; an aromatic solvent such as toluene and xylene; an aliphatic solvent such as n-pentane, n-hexane, n-heptane, and n-octane; an alicyclic solvent such as cyclohexane, methylcyclohexane, and cyclopentane; an alcohol based solvent such as methanol, ethanol, and isopropyl alcohol; a glycol based solvent such as ethylene glycol and propylene glycol; or a glycol ether based solvent such as propylene glycol monomethyl ether and dipropylene glycol monomethyl ether.

<Heating Step>

In the heating step, the heating is conducted in a state where the aluminum material having the mixture layer formed thereon is placed in the space containing the hydrocarbon-containing substance. In this case, the aluminum material having the mixture layer formed on the surface thereof is dried if necessary, and thereafter, is subjected to the heat treatment in the atmosphere containing the hydrocarbon-containing substance.

In one embodiment of the method, according to the present invention, for manufacturing the electrode structure, a kind of the hydrocarbon-containing substance used in the heat treatment of the aluminum material having the mixture layer of the dielectric particles and the binder formed on the surface thereof is not particularly limited. As the kind of the hydrocarbon-containing substance, for example, cited is a paraffin based hydrocarbon such as methane, ethane, propane, n-butane, isobutene, and pentane; an olefin based hydrocarbon such as ethylene, propylene, butene and butadiene; an acetylene based hydrocarbon such as acetylene; or a derivative of each of these hydrocarbons. Among these hydrocarbons, the paraffin based hydrocarbon such as the methane, the ethane, and the propane are preferable since the paraffin based hydrocarbon becomes gaseous in the step of heating the aluminum material having the mixture layer of the dielectric particles and the binder on the surface thereof. Further preferable is any one kind of the hydrocarbons of the methane, the ethane, and the propane. The most preferable hydrocarbon is the methane.

In addition, in the manufacturing method according to the present invention, the hydrocarbon-containing substance may be used in any state of a liquid state, a gaseous state, and the like. It is only required for the hydrocarbon-containing substance to be present in a space in which the aluminum material having the mixture layer of the dielectric particles and the binder formed on the surface thereof is present. The hydrocarbon-containing substance may be introduced by employing any method in the space in which the aluminum material having the mixture layer formed on the surface thereof is placed. For example, in a case where the hydrocarbon-containing substance is in the gaseous state (the methane, the ethane, the propane, etc.), an enclosed space in which the heat treatment of the aluminum material having the mixture layer formed on the surface thereof is conducted may be filled with the hydrocarbon-containing substance alone or in combination with an inert gas or a reducing gas such as a hydrogen gas. In addition, in a case where the hydrocarbon-containing substance is in the liquid state, the enclosed space may be filled with the hydrocarbon-containing substance alone or in combination with the inert gas or the reducing gas such as the hydrogen gas so as to allow the hydrocarbon-containing substance to be gasified.

In the step of heating the aluminum material having the mixture layer on the surface thereof, a pressure of a heating atmosphere is not particularly limited, and the step thereof may be conducted under an ordinary pressure, a reduced pressure, or an increased pressure. In addition, adjustment of the pressure may be conducted at any time such as time when a certain heating temperature is being retained, time when a temperature is being increased to reach a certain heating temperature, or time when a temperature is being decreased from a certain heating temperature.

A weight ratio of the hydrocarbon-containing substance introduced into the space in which the aluminum material having the mixture layer formed on the surface thereof is placed is not particularly limited. Ordinarily, however, it is preferable that the weight ratio is within a range of greater than or equal to 0.1 part by weight and less than or equal to 50 parts by weight as a value in terms of carbon with respect to 100 parts by weight of the aluminum and it is particularly preferable that the weight ratio is within a range of greater than or equal to 0.5 part by weight and less than or equal to 30 parts by weight as a value in terms of carbon.

In the step of heating the aluminum material having the mixture layer formed on the surface thereof, a heating temperature may be appropriately set in accordance with composition or the like of the aluminum material to be heated. Ordinarily, however, it is preferable that the heating temperature is within a range of greater than or equal to 450° C. and less than 660° C. and it is more preferable that the heating temperature is within a range of greater than or equal to 530° C. and less than or equal to 620° C. The heating temperature is set to be greater than or equal to 450° C., thereby allowing the crystallized aluminum carbide to be included in the interposing layer including the aluminum and the carbon. Here, in the manufacturing method according to the present invention, heating the aluminum material having the mixture layer formed on the surface thereof at a temperature of less than 450° C. is not excluded, and the aluminum material having the mixture layer formed on the surface thereof may be heated at least at a temperature exceeding 300° C.

Although a heating time depends on a heating temperature or the like, the heating time is within a range of greater than or equal to 1 hour and less than or equal to 100 hours in general.

In a case where a heating temperature is greater than or equal to 400° C., it is preferable that an oxygen concentration in the heating atmosphere is less than or equal to 1.0% by volume. If a heating temperature is greater than or equal to 400° C. and an oxygen concentration in the heating atmosphere exceeds 1.0% by volume, it is likely that a thermally oxidized film on the surface of the aluminum material is overgrown, an interface electrical resistance in the surface of the aluminum material is increased, and an internal resistance value of the electrode structure is boosted.

In addition, in the method, according to the present invention, for manufacturing the electrode structure, after the step of heating the aluminum material in the state where the aluminum material having the mixture layer formed thereon is placed in the space including the hydrocarbon-containing substance, a step of further heating the aluminum material in a state where the aluminum material having the mixture layer formed thereon is placed in a space including oxygen may be conducted. This allows a capacitance of the electrode structure to be further increased.

Although in the step of heating in the state where the aluminum material having the mixture layer formed thereon is placed in the space including the oxygen, the space including the oxygen is not particularly limited, it is only required for the oxygen to be present in the space in which the aluminum material is placed and it is preferable that the space includes 2% through 50% by volume of the oxygen. This heating step may be conducted ordinarily in the air.

A heating temperature in the above-mentioned further heating step may be appropriately set in accordance with the composition and the thickness of the dielectric layer, conditions in the step of heating in the state where the aluminum material is placed in the space including the hydrocarbon-containing substance, and the like. Ordinarily, it is preferable that the heating temperature is less than or equal to 400° C. and it is more preferable that the heating temperature is within a range of greater than or equal to 100° C. and less than or equal to 350° C. If the temperature exceeds 400° C., the aluminum oxide is excessively formed in an interface between the dielectric layer and the aluminum material, thereby leading to the problems in that a reduction in a capacitance is induced and that the organic substance layer is dissolved, thereby reducing the adhesiveness.

Although a heating time in the above-mentioned further heating step depends on a heating temperature or the like, the heating time is within a range of greater than or equal to 10 seconds and less than or equal to 50 hours in general.

In addition, in the method, according to the present invention, for manufacturing the electrode structure, after the step of heating the aluminum material in the state where the aluminum material is placed in the space including the hydrocarbon-containing substance, a step of anodic oxidation may be conducted. This step allows the aluminum oxide to be included in the interposing layer including the aluminum and the carbon. Although the step of anodic oxidation is not particularly limited, the step may be conducted in a solution of an ammonium adipate or the like with a voltage of greater than or equal to 1V and less than or equal to 10V.

The electrode structure according to the present invention is applicable to both of an anode material and a cathode material.

EXAMPLES

In accordance with the below-described examples 1 through 8 and comparison examples 1 through 4, electrode structures were prepared.

Examples 1 through 5

Two parts by mass of titanium oxide particles (corresponding to dielectric particles) having an average particle diameter of 10 nm measured by employing a powder X-ray diffractometry were mixed with one part by mass of each binder shown in Table 1 and with 7 parts by mass of each solvent (a mixture ratio of toluene and methyl ethyl ketone was 1:1 in examples 2 through 5) shown in Table 1 and were dispersed therein, thereby preparing each coating solution of a mixture of the dielectric particles and the binder, which had a solid content of 30% by mass. Each of these coating solutions was applied onto both surfaces of aluminum foil having a thickness of 30 μm and a purity of 99.3% by mass, thereby forming each mixture layer of the dielectric particles and the binder on the surfaces of the aluminum foil, and drying was conducted by heating in the air at a temperature of 150° C. for 30 seconds (mixture layer formation step). Thereafter, the aluminum foil whose surfaces had the mixture layers formed thereon was placed in a methane gas atmosphere, and the aluminum foil placed in the methane gas atmosphere was heated at a temperature of 550° C. for 10 hours (heating step), thereby obtaining each electrode structure according to the present invention. Each thickness of the dielectric layer formed on each of the surfaces of the aluminum foil after the heating step was within a range of 1 through 3 μm as shown in Table 1.

Example 6

The electrode structure obtained in example 2 was place in the air and heated at a temperature of 200° C. for 5 hours, thereby obtaining an electrode structure in example 6.

Figure 1:
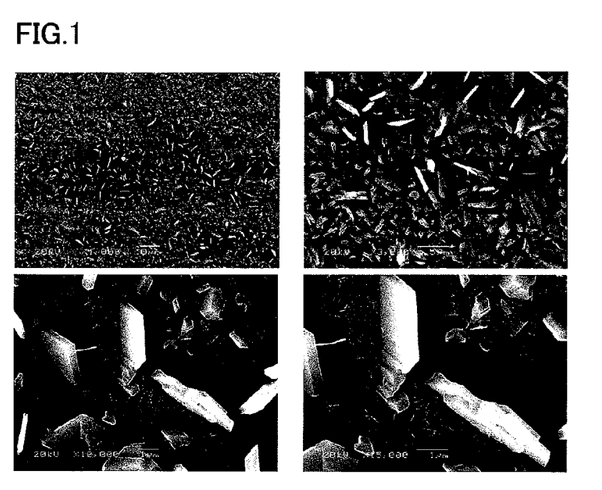
FIG. 1 shows photographs obtained through dissolving an aluminum part by using a bromine-methanol-mixed solution to observe an interposing layer of a sample in example 2 according to the present invention and through directly observing a surface of the remaining interposing layer by using a scanning electron microscope (SEM).

In order to observe an interposing layer of the electrode structure obtained in example 2, the aluminum foil was dissolved by using a bromine-methanol mixture solution, and a surface of the remaining interposing layer was directly observed by using a scanning electron microscope (SEM). Photographs obtained by observing the surface of the remaining interposing layer are shown in FIG. 1. In other words, FIG. 1 shows the photographs each obtained by observing a back side of the surface of the interposing layer which had the aluminum foil removed therefrom and was exposed, the back side of the electrode structure viewed from the interposing layer toward the dielectric layer. In FIG. 1, magnifications of the photographs were 1000 times, 3000 times, 10000 times, and 15000 times in the order.

As shown in FIG. 1, platy crystallized substances between the aluminum foil and the dielectric layer were confirmed. In addition, by using an X-ray micro analyzer (EPMA) and employing an X-ray diffractometry, it was confirmed that the above-mentioned platy crystallized substances were aluminum carbide.

Figure 2:
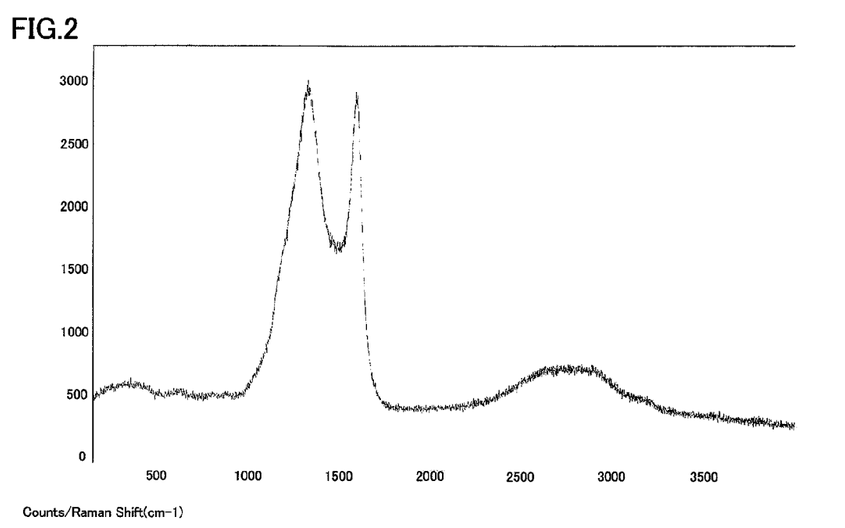
FIG. 2 shows a Raman spectrum detected by employing a Raman spectroscopy with respect to an organic substance layer of the sample in example 2 according to the present invention.

In addition, when with respect to the electrode structure obtained in example 2, components included in the dielectric layer were checked in a Raman spectrum detected by employing a Raman spectroscopy (a measuring apparatus name: Ramascope1000, a microscopic Raman system produced by Renishaw plc), a peak of a Raman scattering intensity corresponding to amorphous carbon in a Raman shift was detected in the vicinity of 1350 cm$^{-1}$ and further, a peak of a Raman scattering intensity corresponding to graphite in the Raman shift was detected in the vicinity of 1580 cm$^{-1}$. The Raman spectrum is shown in FIG. 2. Accordingly, it was confirmed that the organic substance layer was present in the dielectric layer.

Examples 7 and 8

Two parts by mass of tantalum oxide ($Ta_2O_5$) particles (corresponding to dielectric particles) having an average particle diameter of 25 nm measured by employing the powder X-ray diffractometry, in example 7, or two parts by mass of niobium oxide ($Nb_2O_5$) particles (corresponding to dielectric particles) having an average particle diameter of 20 nm measured by employing the powder X-ray diffractometry, in example 8, were mixed with one part by mass of a polyvinyl butyral based binder as a binder as shown in Table 1 and with 7 parts by mass of a mixture solvent of toluene and methyl ethyl ketone (a mixture ratio of toluene and methyl ethyl ketone was 1:1 in examples 7 and 8) as shown in Table 1 and were dispersed therein, thereby preparing each coating solution of a mixture of the dielectric particles and the binder, which had a solid content of 30% by mass. Each of these coating solutions was applied onto both surfaces of aluminum foil having a thickness of 30 μm and a purity of 99.3% by mass, thereby forming each mixture layer of the dielectric particles and the binder on the surfaces of the aluminum foil, and drying was conducted by heating in the air at a temperature of 150° C. for 30 seconds (mixture layer formation step). Thereafter, the aluminum foil whose surfaces had the mixture layers formed thereon was placed in a methane gas atmosphere, and the aluminum foil placed in the methane gas atmosphere was heated at a temperature of 550° C. for 10 hours (heating step), thereby obtaining each electrode structure according to the present invention. Each thickness of the dielectric layer formed on each of the surfaces of the aluminum foil after the heating step was 3 μm as shown in Table 1.

Comparison Examples 1 through 3

The same aluminum foil as that used in examples 1 through 8 was immersed in the below-mentioned titanium alkoxide solution for 3 seconds, and thereafter, was dried by being heated at a temperature of 100° C. for 10 minutes.
<Composition of Titanium Alkoxide Solution>
Ti(n-OC$_4$H$_9$)$_4$: 0.15 mol, CH$_3$COCH$_2$COCH$_3$: 0.45 mol, C$_2$H$_5$OH: 18 mol, H$_2$O: 0.3 mol.

The above-mentioned immersion processing and heating processing under an environment having a relative humidity of less than or equal to 40% were conducted at one time in comparison example 1, were repeated at five times in comparison example 2, and were repeated at ten times in comparison example 3, thereby forming dielectric precursors. Thereafter, each aluminum foil having each of the dielectric precursors formed on the surfaces thereof was placed in a methane gas atmosphere, and the aluminum foil placed in the methane gas atmosphere was heated at a temperature of 550° C. for 10 hours (heating step). Thicknesses of the dielectric layers formed on the surfaces of the aluminum foil after the heating step were 0.1 μm, 0.5 μm, and 1 μm, respectively as shown in Table 1.

Comparison Example 4

Two parts by mass of titanium oxide particles (corresponding to dielectric particles) having an average particle diameter of 10 nm measured by employing the powder X-ray diffractometry were mixed with 8 parts by mass of water and were dispersed therein, thereby preparing a coating solution having a solid content of 20% by mass. This coating solution was applied onto both surfaces of aluminum foil having a thickness of 30 μm and a purity of 99.3% by mass, thereby forming the titanium oxide particles on the surfaces of the aluminum foil, and drying was conducted by heating in the air at a temperature of 150° C. for 30 seconds (corresponding to a step in which the binder is not included in the mixture layer formation step in the present invention). Thereafter, the aluminum foil whose surfaces had the titanium oxide particle layer formed thereon was placed in the methane gas atmosphere, and the aluminum foil placed in the methane gas atmosphere was heated at a temperature of 550° C. for 10 hours (heating step). A thickness of the dielectric layer formed on each of the surfaces of the aluminum foil after the heating step was 1 μm as shown in Table 1.

A capacitance and adhesiveness of each of the electrode structures obtained in examples 1 through 8 and comparison examples 1 through 4 were evaluated. The evaluation conditions are as described below. The result of evaluation is shown in Table 1.

[Capacitance]
The preparation of samples for measurement of capacitances and a method of measuring the capacitances were based on a method of measuring a capacitance of chemical foil for a very low voltage for an electrolytic capacitor, defined in the EIAJ standard.

[Adhesiveness]
The adhesiveness was evaluated by employing a taping method. Specifically, a strip-like sample having a width of 10 mm and a length of 100 mm was prepared, an adhesive tape (manufactured by Sumitomo 3M Limited, with a trade name "Scotch Tape") which had an adhesive surface having a width of 15 mm and a length of 120 mm was pressed against a surface of a dielectric layer of the sample, and thereafter, the adhesive tape was peeled off, and the adhesiveness was evaluated in accordance with the following equation.

Adhesiveness(%)=(Weight of sample after peeling-off [mg]−Weight of sample of aluminum alone used as base material [mg])÷(Weight of sample before peeling-off [mg]−Weight of sample of aluminum alone used as base material [mg])×100[%].

In this equation, in a case where no exfoliation is confirmed at all before and after peeling-off, the value is 100.

As the weight of the sample of the aluminum foil alone used as the base material, a weight of a sample obtained by cutting the aluminum foil before the dielectric layer was formed so as to have the same shape as the above-mentioned strip-like sample was measured and used.

TABLE 1

|  | Dielectric particles | Binder | Solvent | Metal alkoxide solution | Thickness of dielectric layer [μm] | Capacitance [μF/cm$^2$] | Adhesiveness [%] |
| --- | --- | --- | --- | --- | --- | --- | --- |
| Example 1 | Titanium oxide | Polyvinyl alcohol based | Water | — | 3 | 3394 | 97 |
| Example 2 | Titanium oxide | Polyvinyl butyral based | Toluene/ Methyl ethyl ketone | — | 3 | 3468 | 98 |
| Example 3 | Titanium oxide | Phenol based | Toluene/ Methyl ethyl ketone | — | 3 | 3215 | 99 |
| Example 4 | Titanium oxide | Polyvinyl chloride based | Toluene/ Methyl ethyl ketone | — | 3 | 3324 | 97 |

TABLE 1-continued

|  | Dielectric particles | Binder | Solvent | Metal alkoxide solution | Thickness of dielectric layer [μm] | Capacitance [μF/cm²] | Adhesiveness [%] |
|---|---|---|---|---|---|---|---|
| Example 5 | Titanium oxide | Acryl based | Toluene/Methyl ethyl ketone | — | 1 | 1371 | 99 |
| Example 6 | Titanium oxide | Polyvinyl butyral based | Toluene/Methyl ethyl ketone | — | 3 | 3846 | 97 |
| Examples 7 | Tantalum oxide | Polyvinyl butyral based | Toluene/Methyl ethyl ketone | — | 3 | 1654 | 99 |
| Example 8 | Niobium oxide | Polyvinyl butyral based | Toluene/Methyl ethyl ketone | — | 3 | 2347 | 99 |
| Comparison example 1 | — | — | — | Titanium alkoxide | 0.1 | 612 | 96 |
| Comparison example 2 | — | — | — | Titanium alkoxide | 0.5 | 930 | 89 |
| Comparison example 3 | — | — | — | Titanium alkoxide | 1 | Unmeasurable due to exfoliation | 8 |
| Comparison example 4 | Titanium oxide | — | Water | — | 1 | Unmeasurable due to exfoliation | 5 |

It is seen that even when the thickness of the dielectric layer is thick, each of the electrode structures obtained in examples 1 through 8 according to the present invention is excellent in the adhesiveness and exhibits the higher capacitance than the conventional one, as compared with each of the electrode structures obtained in comparison examples 1 through 4.

The above-described embodiment and examples are to be considered in all respects only as illustrative and not restrictive. It is intended that the scope of the invention is, therefore, indicated by the appended claims rather than the foregoing description of the embodiment and examples and that all modifications and variations coming within the meaning and equivalency range of the appended claims are embraced within their scope.

INDUSTRIAL APPLICABILITY

By using an electrode structure according to the present invention for a capacitor, a battery, or the like, even when a thickness of a dielectric layer is thick, excellent adhesiveness between an aluminum material as a base material and a dielectric layer as well as a higher capacitance than the conventional one can be obtained.

The invention claimed is:

1. A method for manufacturing an electrode structure, comprising:
    a mixture layer formation step of forming a mixture layer of dielectric particles including valve metal and a binder on a surface of an aluminum material, wherein the valve metal is at least one member selected from the group consisting of magnesium, thorium, cadmium, tungsten, tin, iron, silver, silicon, tantalum, titanium, hafnium, zirconium, and niobium; and
    a heating step of heating the aluminum material in a state where the aluminum material having the mixture layer formed thereon is placed in a space including a hydrocarbon-containing substance.

2. The method, according to claim 1, for manufacturing an electrode structure, wherein the heating step is conducted at a temperature in a range of greater than or equal to 450° C. and less than 660° C.

3. The method, according to claim 1, for manufacturing an electrode structure, further comprising a step, after the heating step, of heating the aluminum material in a state where the aluminum material is placed in a space including oxygen.

* * * * *

UNITED STATES PATENT AND TRADEMARK OFFICE
CERTIFICATE OF CORRECTION

| | |
|---|---|
| PATENT NO. | : 8,638,545 B2 |
| APPLICATION NO. | : 13/752075 |
| DATED | : January 28, 2014 |
| INVENTOR(S) | : Kunihiko Nakayama et al. |

It is certified that error appears in the above-identified patent and that said Letters Patent is hereby corrected as shown below:

ON THE TITLE PAGE:

At item (72), Inventors, change "Hietoshi Inoue, Osaka (JP)" to --Hidetoshi Inoue, Osaka (JP)--.

Signed and Sealed this
Eighth Day of July, 2014

Michelle K. Lee
*Deputy Director of the United States Patent and Trademark Office*